United States Patent [19]
Geiser et al.

[11] Patent Number: 5,813,221
[45] Date of Patent: Sep. 29, 1998

[54] AUGMENTER WITH INTEGRATED FUELING AND COOLING

[75] Inventors: Frank A. Geiser; Timothy J. Freking, both of Cincinnati; Ivan E. Woltmann, West Chester, all of Ohio

[73] Assignee: General Electric Company, Cincinnati, Ohio

[21] Appl. No.: 783,519

[22] Filed: Jan. 14, 1997

[51] Int. Cl.[6] .................................................. F02K 3/08
[52] U.S. Cl. .................................................. 60/261; 60/266
[58] Field of Search .................. 60/226.1, 261, 60/262, 266

[56] References Cited

U.S. PATENT DOCUMENTS

| | | | |
|---|---|---|---|
| 3,800,530 | 4/1974 | Nash | 60/261 |
| 4,064,691 | 12/1977 | Nash | 60/39.06 |
| 4,134,260 | 1/1979 | Lefebvre et al. | 60/261 |
| 4,461,146 | 7/1984 | DuBell | 60/261 |
| 4,817,378 | 4/1989 | Giffin, III et al. | 60/261 |
| 4,899,539 | 2/1990 | Gastebois et al. | 60/261 |
| 4,901,527 | 2/1990 | Nash et al. | 60/261 |
| 5,076,062 | 12/1991 | Abreu | 60/261 |
| 5,117,628 | 6/1992 | Koshoffer | 60/261 |
| 5,396,763 | 3/1995 | Mayer et al. | 60/261 |
| 5,400,589 | 3/1995 | Mahias et al. | 60/261 |

OTHER PUBLICATIONS

General Electric Company, "F110 Gas Turbofan Engine," three drawing sheets, U.S. public use more than one year.

Primary Examiner—Louis J. Casaregola
Attorney, Agent, or Firm—Andrew C. Hess; Patrick R. Scanlon

[57] ABSTRACT

A turbofan engine augmenter includes an exhaust casing and a combustion liner therein which define therebetween a cooling duct for receiving bypass air. A diffusion liner adjoins the combustion liner and defines with the casing an outer inlet for receiving the bypass air, and a radially inner inlet for receiving core gases. A ring flameholder includes an aft facing radial wall adjoining the diffusion liner, and an integral axial wall adjoining the combustion liner. A plurality of circumferentially spaced apart radial flameholders extend inwardly from the casing and through the diffusion liner forward of the ring flameholder, and each includes a first fuel spraybar for injecting fuel into the core gases. A mixer defined by a plurality of injector chutes extends radially inwardly through the diffusion liner, with the chutes being spaced between respective pairs of the radial flameholders. Each injector chute includes an inlet for receiving the bypass air, and an outlet at an opposite end for injecting the bypass air into the core gases.

10 Claims, 5 Drawing Sheets

5,813,221

AUGMENTER WITH INTEGRATED FUELING AND COOLING

BACKGROUND OF THE INVENTION

The present invention relates generally to aircraft gas turbine engines, and, more specifically, to augmented military engines.

High performance military aircraft typically include a turbofan gas turbine engine having an afterburner or augmenter for providing additional thrust when desired. The turbofan engine includes in serial flow communication a multistage fan, a multistage compressor, a combustor, a high pressure turbine powering the compressor, and a low pressure turbine powering the fan. During operation, air is compressed in turn through the fan and compressor and mixed with fuel in the combustor and ignited for generating hot combustion gases which flow downstream through the turbine stages which extract energy therefrom. The hot core gases are then discharged into an augmenter from which they are discharged from the engine through a variable area exhaust nozzle.

The augmenter includes an exhaust casing and liner therein which defines a combustion zone. Fuel spraybars and flameholders are mounted between the turbines and the exhaust liner for injecting additional fuel when desired during reheat operation for burning in the augmenter combustor for producing additional thrust.

In a bypass turbofan engine, an annular bypass duct extends from the fan to the augmenter for bypassing a portion of the fan air around the core engine to the augmenter, which bypass air is used in part for cooling the exhaust liner. The bypass fan air must also be efficiently mixed with the core gases prior to discharge through the exhaust nozzle. This is typically accomplished using a convoluted daisy mixer having circumferentially alternating hot and cold chutes which respectively channel the core gases and bypass fan air therethrough in radially outward and inward paths for mixing at the exit plane thereof.

Various types of flameholders are known and typically include radial and circumferential V-shaped gutters which provide stagnation regions therebehind of local low velocity regions in the otherwise high velocity core gases for sustaining combustion during reheat operation. Since the core gases are the product of combustion in the core engine, they are initially hot, and are further heated when combusted with the bypass air and additional fuel during reheat operation.

Accordingly, the various components of the augmenter must be suitably cooled during operation for ensuring a suitable useful life thereof. Each component must be designed both individually and in combination with the cooperating components for not only providing effective cooling thereof but effective performance of the augmenter during both dry, unfueled operation and reheat, fueled operation.

Although the exhaust liner is typically film cooled, it is subject to temperature variations due to hot streaks, for example, which can locally reduce the cooling margin of the liner leading to decreased life thereof. Since fuel is typically injected upstream of the flameholders, undesirable auto-ignition of the fuel and combustion which might occur upstream of the flameholders causes flameholder distress which also significantly reduces the useful life of the flameholders. Since V-gutter flameholders are suspended within the core gases, they are more difficult to effectively cool, and typically experience circumferential variation in temperature which correspondingly effects thermal stress, which also decreases the useful life thereof. And, V-gutter flameholders have limited flameholding capability, and correspondingly affects the size and thrust capability of the engine.

Accordingly, additional improvements in cooling and durability of the augmenter are desired along with improved performance.

SUMMARY OF THE INVENTION

A turbofan engine augmenter includes an exhaust casing and a combustion liner therein which define therebetween a cooling duct for receiving bypass air. A diffusion liner adjoins the combustion liner and defines with the casing an outer inlet for receiving the bypass air, and a radially inner inlet for receiving core gases. A ring flameholder includes an aft facing radial wall adjoining the diffusion liner, and an integral axial wall adjoining the combustion liner. A plurality of circumferentially spaced apart radial flameholders extend inwardly from the casing and through the diffusion liner forward of the ring flameholder, and each includes a first fuel spraybar for injecting fuel into the core gases. A mixer defined by a plurality of injector chutes extends radially inwardly through the diffusion liner, with the chutes being spaced between respective pairs of the radial flameholders. Each injector chute includes an inlet for receiving the bypass air, and an outlet at an opposite end for injecting the bypass air into the core gases.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
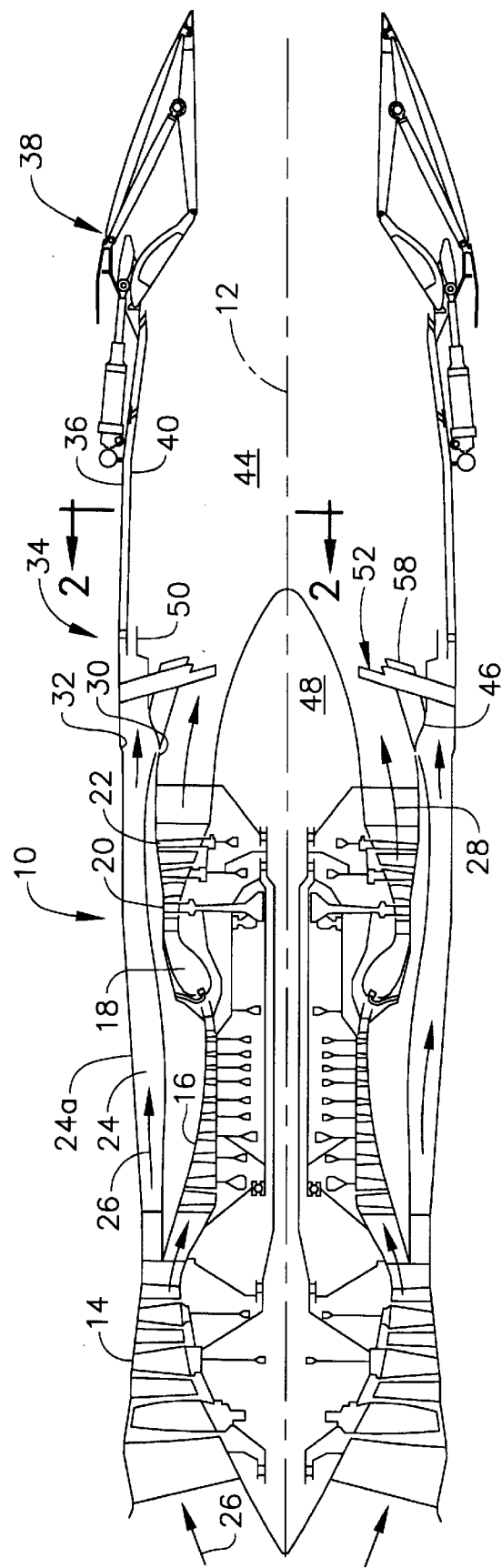
FIG. 1 is an axial sectional view through an exemplary turbofan gas turbine engine having an augmenter in accordance with one embodiment of the present invention.

Illustrated in FIG. 1 is an exemplary medium bypass ratio turbofan gas turbine engine 10 for powering an aircraft (not shown) in flight. The engine 10 is axisymmetrical about a longitudinal or axial centerline axis 12 and includes in serial flow communication a multistage fan 14, multistage axial compressor 16, annular combustor 18, single stage high pressure turbine 20 suitably joined to the compressor 16 by a drive shaft, and a multistage low pressure turbine 22 suitably joined to the fan 14 by a drive shaft. Surrounding the core engine is an annular bypass duct 24 which extends from the fan 14 downstream past the low pressure turbine 22 for effecting medium bypass ratios in a conventional manner.

More specifically, the engine 10 as described above is conventional in structure and operation. Air 26 enters the engine and is initially pressurized as it flows through the fan 14, with an inner portion thereof flowing through the compressor 16 for further compression, and an outer portion bypassing the core engine for flow through the bypass duct 24. The core engine airflow is suitably mixed with fuel in the combustor 18 and ignited for generating hot combustion gases which flow through the turbines 20, 22 and are discharged therefrom as core gases 28.

The core engine also includes an annular core outlet 30, and the bypass duct 24 includes a coannular outlet 32 therearound for respectively discharging the core gases 28 and bypass fan air 26 into an augmenter 34 configured in accordance with the present invention.

The augmenter 34 includes an annular exhaust casing 36 which is disposed coaxially with and is suitably attached to the corresponding casing 24a surrounding the bypass duct 24. Suitably mounted to the aft end of the exhaust casing 36 is a conventional variable area converging-diverging (CD) exhaust nozzle 38 through which the bypass fan air 26 and core gas 28 are discharged during operation.

Figure 2:
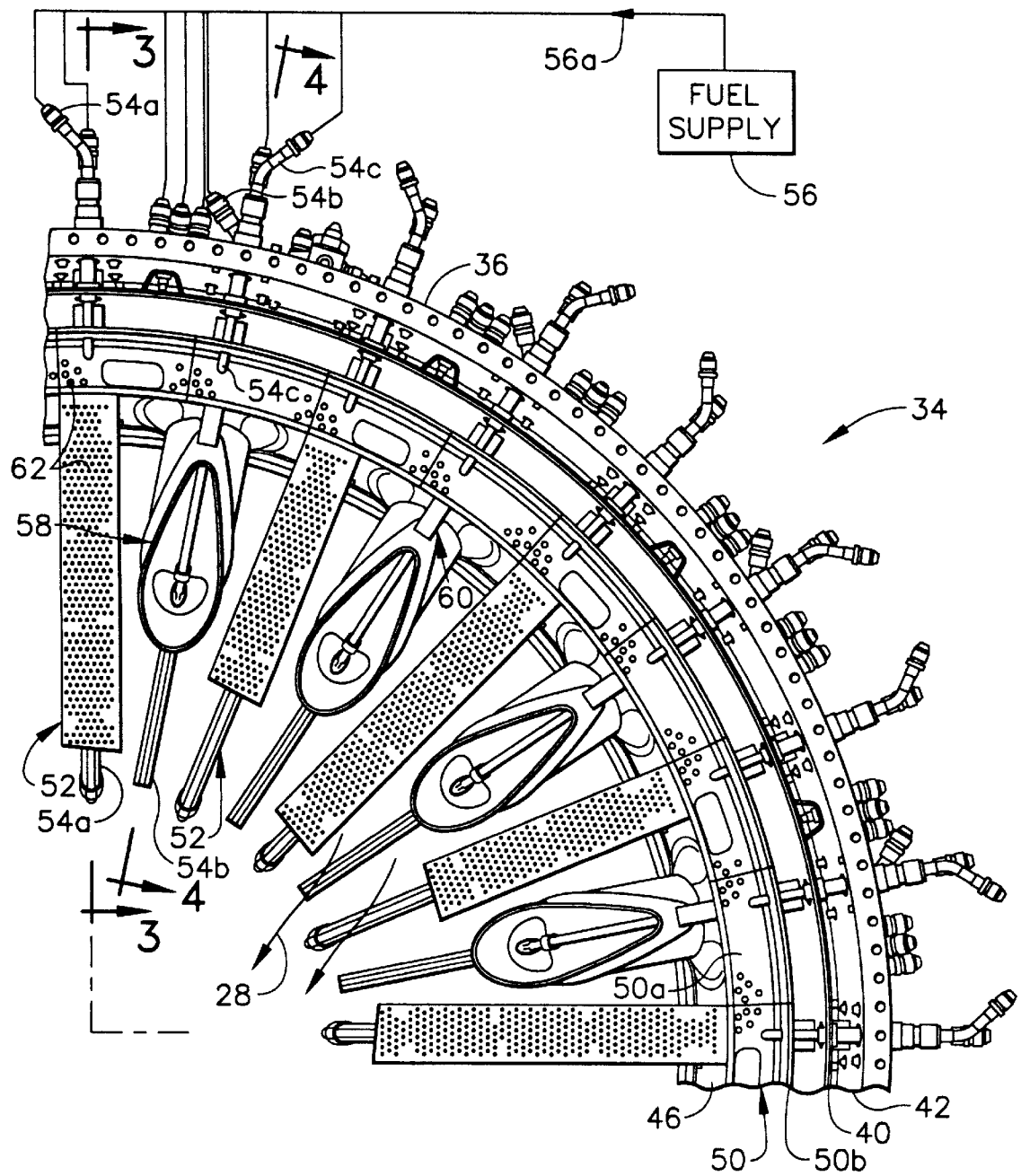
FIG. 2 is an aft-facing-forward radial elevational view of a portion of the augmenter illustrated in FIG. 1 and taken along line 2—2.
Figure 3:
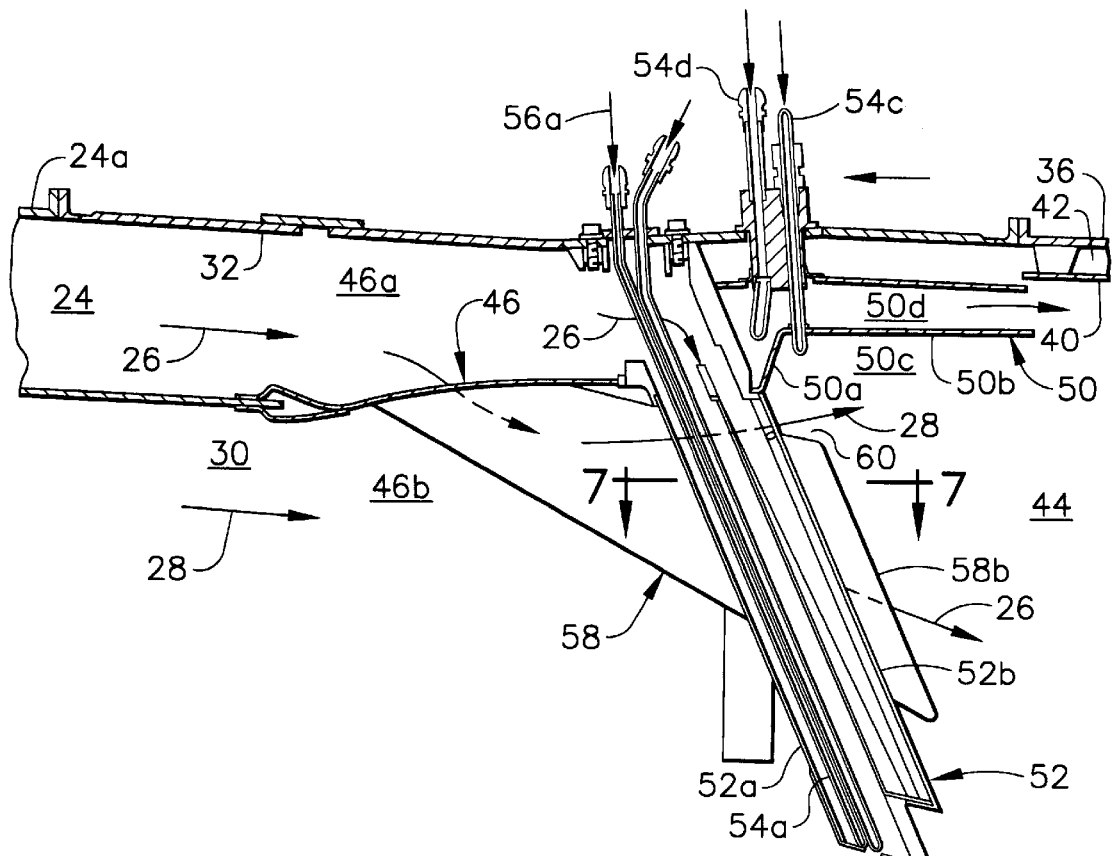
FIG. 3 is a partly sectional, axial view through an exemplary radial flameholder of the augmenter illustrated in FIG. 2 and taken generally along line 3—3.

The augmenter 34 is illustrated in more particularity in FIGS. 2 and 3 and further includes an annular combustion or exhaust liner 40 spaced radially inwardly from the exhaust casing 36 to define therebetween an annular cooling duct 42 disposed in flow communication with the bypass duct 24 for receiving therefrom a portion of the bypass fan air 26. The combustion liner 40 also defines radially inwardly therefrom an augmenter combustion zone 44, shown also in FIG. 1.

An annular diffusion liner 46 axially adjoins the forward end of the combustion liner 40 inside the casing 36, and defines with the casing 36 an annular outer inlet 46a for receiving from the bypass duct outlet 32 the bypass fan air 26. The diffusion liner 46 also defines an annular inner inlet 46b for receiving the core gases 28 from the core outlet 30. As shown in FIG. 1, the engine 10 also includes a converging centerbody 48 which extends aft from the core outlet 30 and partially into the augmenter 34 for defining with the diffusion liner 46 a suitable diffuser which decreases the velocity of the core gases 28 as they enter the augmenter 34 in a conventional manner.

As shown in FIGS. 2 and 3, the augmenter 34 further includes a circumferential or ring flameholder 50 at the outer diameter of the augmenter 34 for maximizing the effective flameholding area thereof. The ring flameholder 50 includes an aft facing, annular radial wall 50a which axially adjoins the diffusion liner 46 and may be formed integrally therewith at the aft end thereof. The ring flameholder 50 also includes an integral axial wall 50b in the exemplary form of a cylinder which adjoins the combustion liner 40. The ring flameholder 50 in axial section as illustrated in FIG. 3 is in the form of an aft facing step which defines a recirculation zone 50c providing a stagnation region for effecting flameholding capability thereat.

As shown in FIGS. 2 and 3, a plurality of circumferentially spaced apart radial flameholders 52 extend radially inwardly from the casing 36 and through the diffusion liner 46 forward or upstream of the ring flameholder 50. As shown in FIG. 3, each radial flameholder 52 includes one or more integral first fuel spraybars 54a. As shown in FIG. 2, the individual spraybars 54a are suitably joined in flow communication with a conventional fuel supply 56 which is effective for channeling fuel 56a to each of the spraybars for injecting the fuel 56a into the core gases 28 which flow into the combustion zone 44.

Figure 4:
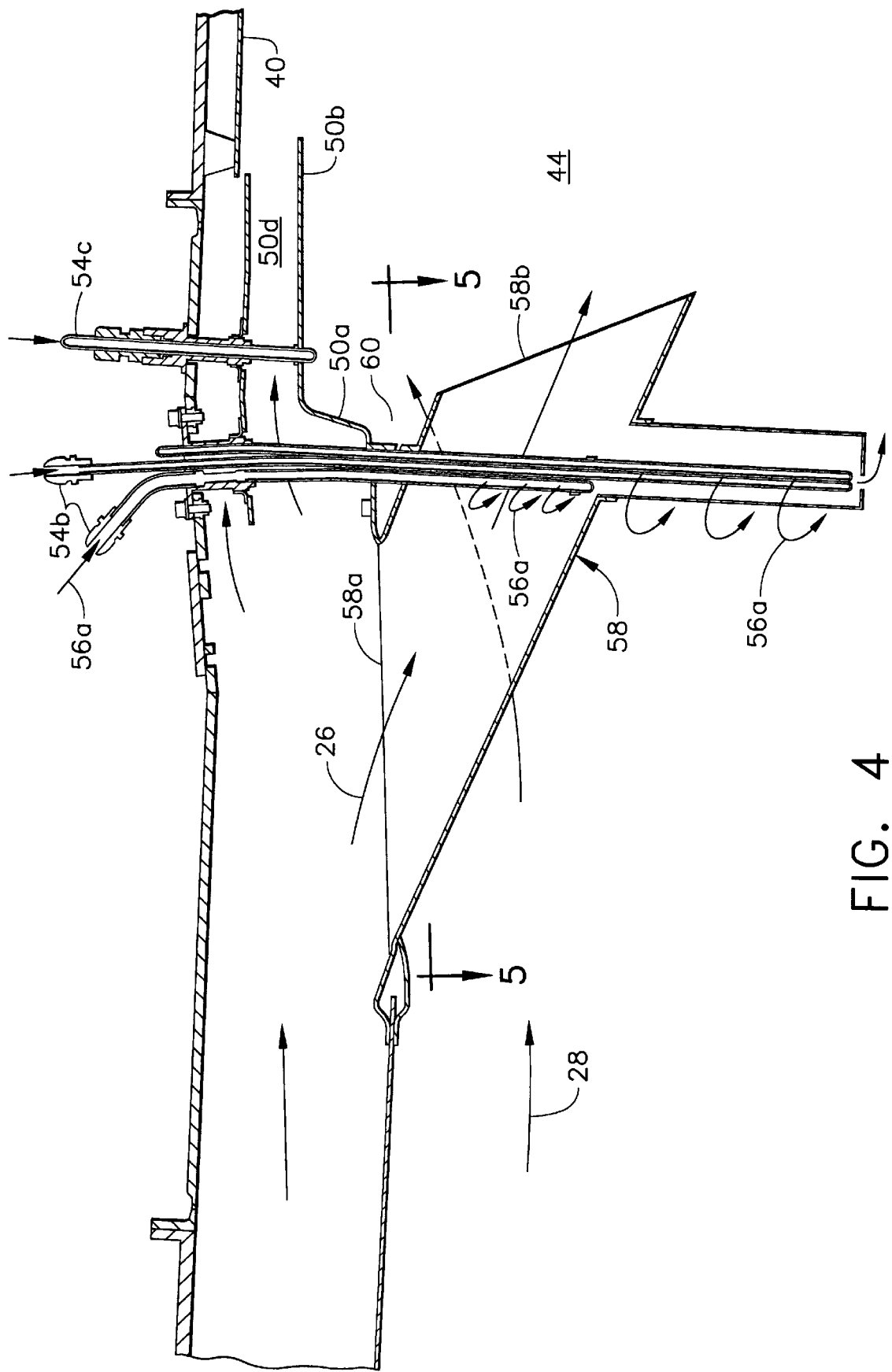
FIG. 4 is a partly sectional axial view through an exemplary injector chute of the augmenter illustrated in FIG. 2 and taken generally along line 4—4.
Figure 5:
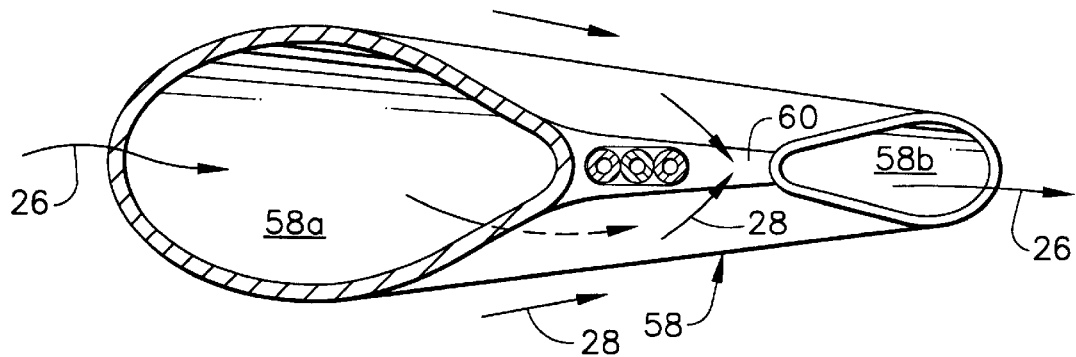
FIG. 5 is a radially inwardly facing, partly sectional view through the exemplary injector chute illustrated in FIG. 4 and taken generally along line 5—5.

As shown in FIGS. 2, 3, and 4, a mixer is provided and is defined by a plurality of tubular injector chutes 58 which extend radially inwardly through the diffusion liner 46, and are spaced circumferentially apart between respective pairs of the radial flameholders 52 as illustrated in FIG. 2. As shown in FIGS. 4 and 5, each chute 58 has an inlet 58a coextensive with the diffusion liner 46 for receiving the bypass fan air 26 therefrom, and an outlet 58b at an opposite longitudinal or axial end for injecting the fan air 26 into the core gases 28 for mixing in the combustion zone 44.

The ring flameholder 50, radial flameholders 52, and mixer chutes 58 collectively provide enhanced performance of the augmenter 34 in accordance with the present invention while improving durability and effective life thereof. The individual radial flameholders 52 provide flameholding capability in conjunction with the ring flameholder 50 disposed at the radially outer ends thereof which maximizes flameholding capability, efficiency, and performance. In this way, the augmenter 34 is effective for use in medium to high bypass ratio engines 10 which have relatively large fan discharge flowrates through the augmenter 34.

Of particular significance is the ability of the injector chutes 58 to channel the bypass fan air 26, as shown in FIGS. 3 and 4, radially inwardly toward the centerline of the engine for both effective mixing with the core gases 28, needed for dry performance, and for isolating the relatively cold fan air 26 away from the relatively hot recirculation zone 50c of the ring flameholder 50 during reheat operation for promoting combustion stability.

A conventional daisy mixer creates circumferentially alternating regions of cold fan air and hot core gas which bathe cooperating circumferential V-gutters typically used for flameholding. The circumferential variation temperature distribution creates undesirable circumferentially varying thermal stress in the gutters which decreases the durability and life of the conventional augmenter.

In accordance with the present invention as illustrated in FIGS. 3 and 4, the injector chutes 58 are spaced in aft part radially inwardly of the ring flameholder 50 at the radial wall 50a thereof to define a radial buffer zone 60. The buffer zone 60 at each of the chutes 58 allows the core gases 28 to reattach axially therein directly below the ring flameholder 50 for promoting combustion stability, and maintaining a more uniform hot core gas temperature around the inner circumference of the ring flameholder.

Note in FIG. 2 that the individual chutes 58 are interposed between adjacent radial flameholders 52. The hot core gases 28 flow axially around each of the radial flameholders 52 and chutes 58. The core gases 28 therefore bound the inboard side of the ring flameholder 50. By spacing the chute outlets 58b radially inwardly below the ring flameholder 50 and the recirculation zone 50c, the fan air 26 is injected into the combustion zone 44 radially inwardly of the buffer zone 60 to promote combustion stability in the ring flameholder 50, and reduce circumferential temperature gradients.

In this way, a more uniform circumferential temperature distribution of the ring flameholder 50 may be maintained in operation, during both dry and reheat operation, for improving the durability and useful life of the ring flameholder 50. The chutes 58 channel the bypass fan air 26 more closely to the centerline of the engine for improving mixing effectiveness with the core gases 28. And most significantly, the relatively cold bypass fan air 26 is isolated from the recirculation zone 50c of the ring flameholder 50 improving performance thereof, and improving combustion stability especially during initial ignition and propagation of the flame during reheat operation.

As shown in FIGS. 2 and 5, each of the injector chutes 58 preferably has an aerodynamically streamlined airfoil or teardrop shape for allowing the core gases 28 to reattach or rejoin in the buffer zones 60 inwardly of the ring flameholder 50. In the preferred embodiment illustrated in FIGS. 2 and 5, each of the injector chutes 58 is teardrop shaped both axially and radially, with a minimum profile at the buffer zone 60 for improving circumferential flow uniformity of the core gases 28 below the ring flameholder 50. As shown in FIG. 5, both the inlet 58a and outlet 58b of the chutes 58 are also generally teardrop shaped in section.

Since the inboard side of the ring flameholder 50 is directly subject to the hot core gases 28 flowing through the combustion zone 44, the ring flameholder 50 is preferably cooled on its backside or radially outer surfaces. As shown in FIGS. 3 and 4, the ring flameholder axial wall 50b is spaced radially inwardly from the combustion liner 40 to define a ring duct 50d for discharging the bypass air 26 into the combustion zone 44 along the inner surface of the combustion liner 40. In this way, the bypass fan air 26 flows over the backside of the ring flameholder 50 for providing effective backside cooling thereof, and is then discharged along the inner surface of the combustion liner 40. The combustion liner 40 itself is also backside cooled, and may otherwise include conventional cooling features such as additional film cooling holes therethrough provided along the entire axial extent of the combustion liner 40.

In order to provide various locations for the injection of fuel into the combustion zone 44 during reheat operation, the augmenter 34 as illustrated in FIGS. 2 and 4 preferably also includes a plurality of second fuel spraybars 54b extending radially inwardly through respective ones of the injector chutes 58 for injecting fuel into the fan air channeled therethrough. As shown in FIG. 4, each chute 58 may have one or more of the second fuel spraybars 54b extending therein for injecting the fuel 56a at least into the fan air 26 inside each of the chutes 58. In the exemplary embodiment illustrated in FIG. 4, two of the second fuel spraybars 54b also extend in part radially inwardly of each of the injector chutes 58, and are surrounded by a suitable heat shield, for additionally injecting the fuel 56a into the core gases 28 flowing into the combustion zone 44.

As shown in FIG. 3, a plurality of circumferentially spaced apart third fuel spraybars 54c extend radially inwardly through the ring flameholder 50 for injecting fuel aft of the radial wall 50a thereof and into the recirculation zone 50c fed by the core gases 28 flowable thereat.

And, a plurality of circumferentially spaced apart fourth fuel spraybars 54d extend radially inwardly into the ring duct 50d as illustrated in FIG. 3 for injecting fuel therein to mix with the fan air 26 flowable therethrough. In this way, the backside fan air flowing through the ring duct 50d is fueled during reheat operation and discharged into the combustion zone 44.

The various first, second, third, and fourth fuel spraybars 54a–d may take any conventional configuration and length as desired for injecting fuel at various locations both radially and circumferentially within the combustion zone 44 for providing uniformity of combustion during reheat operation.

The ring flameholder 50 effectively cooperates with the individual radial flameholders 52 for circumferentially propagating the flame between the radial flameholders 52 during initial ignition, conventionally provided in the ring flameholder 50, and during propagation, as well as collectively providing therewith an efficient flameholder surface area for enhanced combustion stability during reheat operation.

In the preferred embodiment illustrated in FIGS. 2 and 3, each of the radial flameholders 52 includes the first fuel spraybars 54a integrally therein, and is fan air cooled. Similar air cooled flameholders are disclosed in detail in U.S. Pat. No. 5,396,763—Mayer et al, assigned to the present assignee, although in that design an inner diameter V-gutter flameholder is used.

Figure 7:
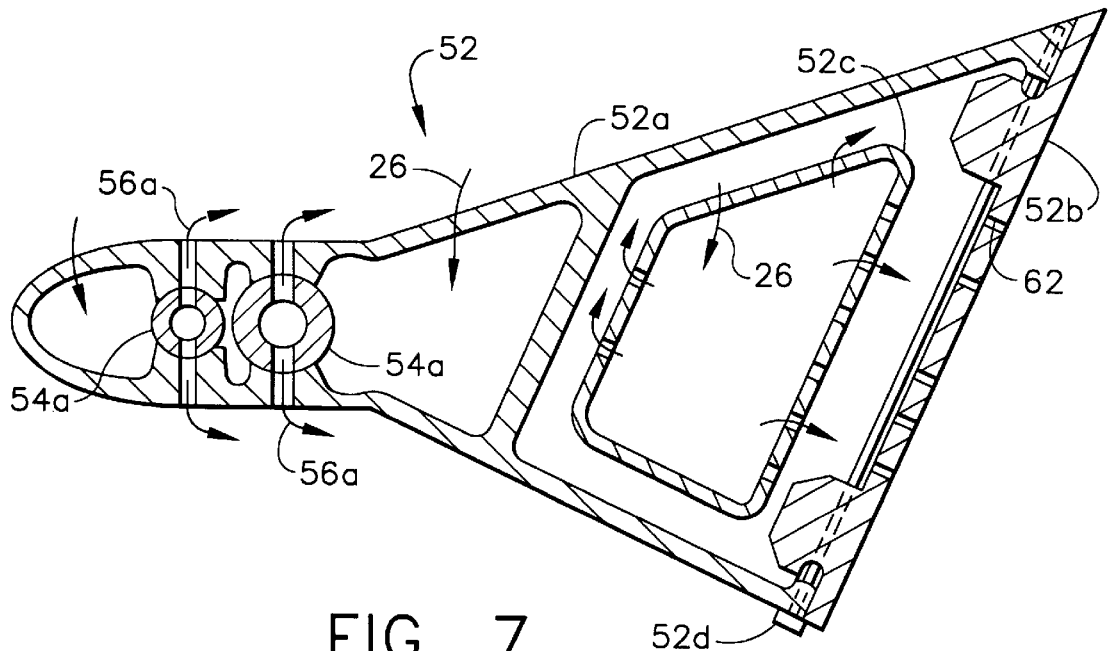
FIG. 7 is a radial sectional view through a portion of the flameholder illustrated in FIG. 3 and taken generally along line 7—7.
Figure 6:
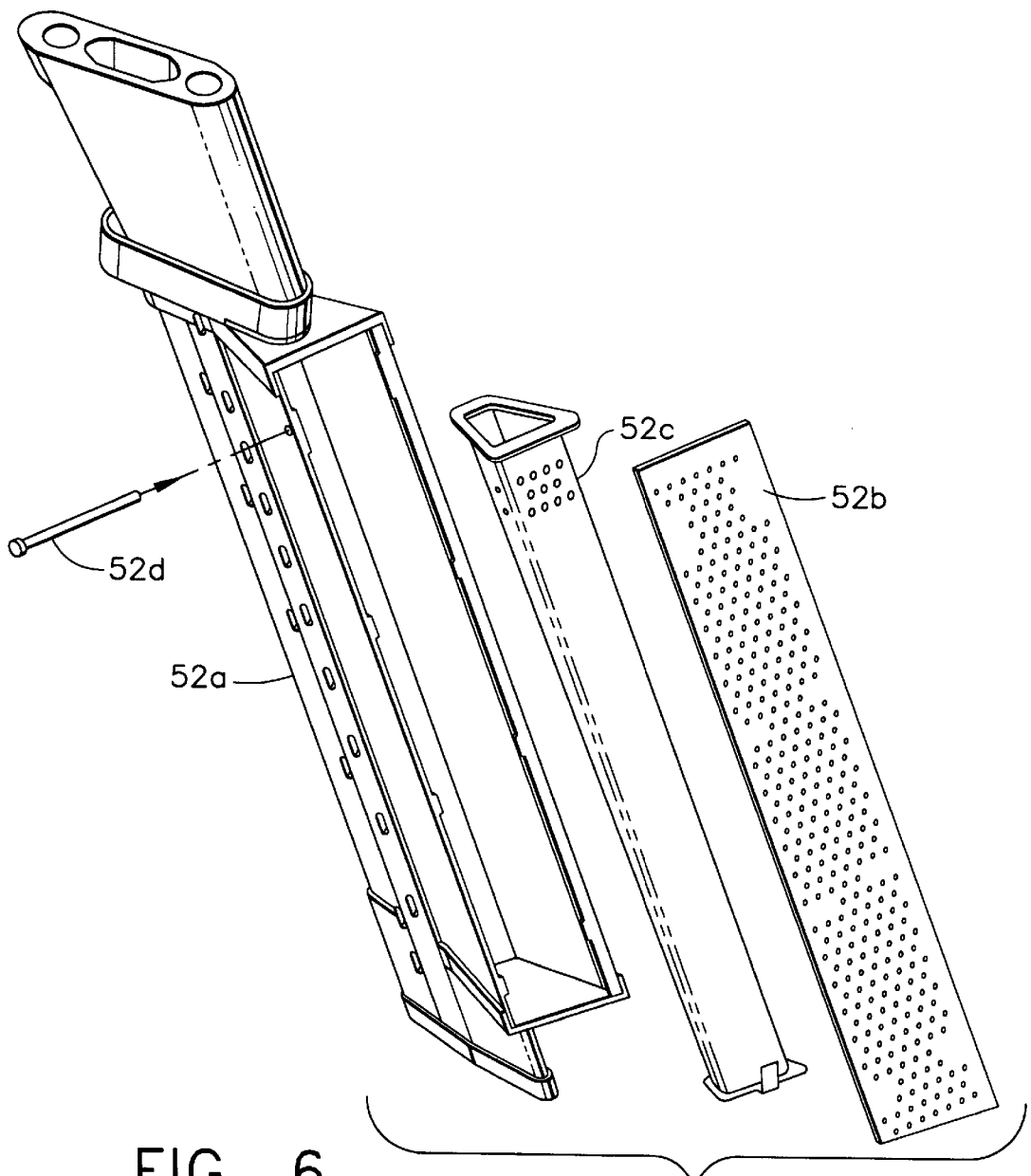
FIG. 6 is an exploded view of the exemplary radial flameholder illustrated in FIG. 3.

In the preferred embodiment of the cooled radial flameholders 52 illustrated in FIGS. 3, 6, and 7, each flameholder includes a first heat shield 52a which defines a streamlined housing for receiving radially therethrough a respective one or more of the first fuel spraybars 54a. The first fuel spraybars 54a have lateral or side discharge outlets which are aligned with corresponding lateral holes through the first heat shield 52a for injecting the fuel 56a into the core gases 28. As shown in FIG. 3, the top of the first heat shield 52a is suitably attached to the exhaust casing 36 and includes a forward facing inlet for receiving a portion of the fan bypass air 26 which flows radially inwardly through the first heat shield 52a. In this way, the first heat shield 52a receives bypass fan air 26 from the outer inlet 46a of the diffusion liner which is carried radially inwardly through the flameholder for cooling thereof.

As shown in FIGS. 6 and 7, each radial flameholder 52 also includes a second heat shield 52b suitably joined to the first heat shield 52a, by vertical bayonet-type pads for example. The second heat shield 52b has an aft facing flat surface which provides flameholding capability.

Disposed inside the first heat shield 52a adjacent to the second heat shield 52b is a hollow impingement baffle 52c which receives in its top end a portion of the fan air 26 entering the first heat shield 52a. The impingement baffle 52c is covered with holes which direct the fan air 26 in impingement against the inner surfaces of the first heat shield 52a and the second heat shield 52b as illustrated in FIG. 7 for providing effective impingement cooling thereof.

As shown in FIG. 7, the first heat shield 52a may take any suitable configuration for supporting therein at its forward end one or more of the first fuel spraybars 54a, and supporting in its aft end the impingement baffle 52c which is enclosed therein by the removable second heat shield 52b. The impingement baffle 52c may be suitably suspended within the first heat shield 52a by an integral top flange slidably mounted thereto, for example. One or more retention pins 52d extend laterally through the aft end of the first heat shield 52a to vertically lock the second heat shield 52b held in position by the vertical bayonet mount. The radial flameholders 52 may take any suitable variation of the corresponding cooled flameholders disclosed in U.S. Pat. No. 5,396,763, incorporated herein by reference.

As shown in FIGS. 2 and 3, the second heat shields 52b preferably extend radially directly adjacent to the inner circumference of the radial wall 50a of the ring flameholder 50 for collectively forming therewith an aft facing flameholding surface. In this way, a direct transition is provided at each of the radial flameholders 52 and the common ring flameholder 50 for effecting cross-ignition during lightoff of the augmenter during reheat operation. And, as illustrated in FIG. 3, the chute outlets 58b are preferably disposed axially aft of the second heat shields 52b and radial wall 50a for enhancing stability of the flameholding capability of the ring and radial flameholders 50, 52.

Although both the ring and radial flameholders 50, 52 are preferably backside and internally cooled, respectively, additional cooling thereof may be provided as desired. For example, the second heat shields 52b of the radial flameholders 52, and the radial wall 50a of the ring flameholder 50 preferably also include film cooling holes 62 as shown in FIG. 2 for channeling the fan air therethrough for providing film cooling of the external surfaces thereof which directly face the hot combustion gases during reheat operation.

The improved performance augmenter 34 described above improves durability of the exhaust system as well as provides for higher thrust derivative products by the new combination of the cooled ring and radial flameholders 50, 52, and injector chutes 58. The cooled flameholders with integral fuel injection improve auto-ignition margin, as well as reduces fuel coking and boiling. The performance augmenter 34 provides improved efficiency during both dry and reheat operation of the augmenter. The individual injector chutes 58 are isolated or decoupled from the ring flameholder 50 as described above for improving thermal durability of the ring flameholder 50 itself by reducing circumferential temperature variations, as well as improved combustion stability during lightoff propagation by isolating the recirculation zone 50c.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An augmenter for a turbofan gas turbine engine having a core outlet for discharging core gases and a coannular bypass duct outlet for discharging bypass fan air, comprising:

an annular exhaust casing;

an annular combustion liner spaced radially inwardly from said exhaust casing to define therebetween a cooling duct for receiving said bypass air, said liner also defining radially inwardly therefrom a combustion zone;

an annular diffusion liner axially adjoining said combustion liner inside said casing, and defining with said casing an annular outer inlet for receiving from said bypass duct outlet said bypass air, and an annular inner inlet for receiving said core gases from said core outlet;

a ring flameholder including an aft facing radial wall adjoining said diffusion liner, and an integral axial wall adjoining said combustion liner;

a plurality of circumferentially spaced apart radial flameholders extending radially inwardly from said casing and through said diffusion liner forward of said ring flameholder, and each including a first fuel spraybar for injecting fuel in said core gases flowable into said combustion zone; and a mixer defined by a plurality of tubular injector chutes extending radially inwardly through said diffusion liner, and circumferentially spaced apart between respective pairs of said radial flameholders, with each chute having an inlet coextensive with said diffusion liner for receiving said bypass air, and an outlet at an opposite end for injecting said bypass air into said core gases for mixing in said combustion zone.

2. An augmenter according to claim 1 wherein said injector chutes are spaced in part radially inwardly of said ring flameholder at said radial wall thereof to define a buffer zone for allowing said core gases to flow therein below said ring flameholder, with said bypass air being injected from said chute outlets radially inwardly of said buffer zone to reduce cooling of said ring flameholder therefrom.

3. An augmenter according to claim 2 wherein each of said injector chutes has an aerodynamically streamlined teardrop shape for allowing said core gases to rejoin in said buffer zone inwardly of said ring flameholder.

4. An augmenter according to claim 3 wherein said ring flameholder axial wall is spaced radially inwardly from said combustion liner to define a ring duct for discharging said bypass air into said combustion zone along said combustion liner, and for allowing backside cooling of said ring flameholder as said bypass air flows therethrough.

5. An augmenter according to claim 4 further comprising:

a plurality of second fuel spraybars extending radially through respective ones of said injector chutes for injecting fuel into said bypass air channeled therethrough;

a plurality of circumferentially spaced apart third fuel spraybars extending radially through said ring flameholder for injecting fuel aft of said radial wall thereof and into said core gases flowable thereat; and a plurality of circumferentially spaced apart fourth fuel spraybars extending radially into said ring duct for injecting fuel therein to mix with said bypass air flowable therethrough.

6. An augmenter according to claim 5 wherein said second fuel spraybars extend in part radially inwardly of said injector chutes for additionally injecting fuel into said core gases flowable into said combustion zone.

7. An augmenter according to claim 5 wherein each of said radial flameholders comprises:

a first heat shield defining a housing for receiving radially therethrough a respective one of said first fuel spraybars, and disposed in flow communication with said outer inlet for receiving said bypass air;

second heat shield joined to said first heat shield, and having an aft facing flat surface for flameholding; and an impingement baffle disposed in said first heat shield adjacent to said second heat shield for receiving said bypass air to effect impingement cooling of both said first and second heat shields.

8. An augmenter according to claim 7 wherein said second heat shields extend radially to said ring flameholder radial wall for collectively effecting flameholding.

9. An augmenter according to claim 8 wherein said second heat shields of said radial flameholders, and said radial wall of said ring flameholder include film cooling holes for channeling said bypass air therethrough for providing film cooling thereof.

10. An augmenter according to claim 8 wherein each of said injector chutes is teardrop shaped both axially and radially, with a minimum profile at said buffer zone.

* * * * *